2,954,376
POLYMETHINE DYES CONTAINING A 4-(HYDROXYMETHYL)- OR 4-(ACETOXYMETHYL)-Δ²-THIAZOLINE OR OXAZOLINE NUCLEUS, AND PREPARATION THEREOF

Jean Marie Nys and Marcel Jan Libeer, Mortsel-Antwerp, Belgium, assignors to Gevaert Photo-Producten N.V., Mortsel, Belgium, a Belgian company
No Drawing. Filed Apr. 8, 1958, Ser. No. 727,038
1 Claim. (Cl. 260—240)

This invention relates to polymethine dyes containing a 4-(hydroxymethyl)- or a 4-(acetoxymethyl)-Δ²-thiazoline or -oxazoline nucleus, and to methods for preparing them.

Some cyanine dyes, derived from the unsubstituted Δ²-oxazoline nucleus, are known.

We have now found an entirely new class of polymethine dyes which are useful as sensitizers for photographic emulsions. It is, accordingly, an object of our invention to provide a new class of polymethine dyes. A further object is to provide methods for preparing these new dyes. Still another object is to provide photographic silver halide emulsions sensitized with these new dyes. Other objects will become apparent from a consideration of the following description and examples.

According to our invention we provide new polymethine dyes containing a Δ²-thiazoline or a Δ²-oxazoline nucleus contaning a 4-(acetoxymethyl)- or a 4-(hydroxymethyl)-substituent.

More particularly, we provide new polymethine dyes selected from the group consisting of—

(1) Cyanine dyes represented by the following general formula

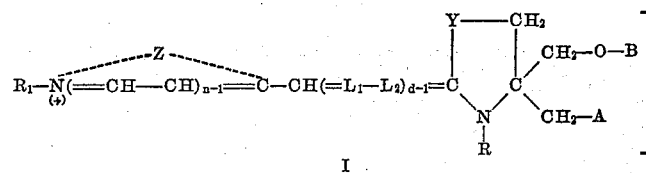

I wherein R and R₁ each represents an allyl group such as methyl, ethyl, propyl, isopropyl, butyl, isobutyl, alkyl (vinyl methyl), β-hydroxyethyl, benzyl (phenyl methyl), carboxybenzyl etc. (e.g. an alkyl group of the formula $C_qH_{2q+1}$ wherein $q$ represents a positive integer from 1 to 4, $L_1$ and $L_2$ each represents a methine group (e.g. =CH—, =C.CH₃—, =C.C₂H₅—, =C.C₃H₇—, =C.C₆H₅—, =C.O alkyl—, =C.S.alkyl—), $n$ represents a positive integer from 1 to 2, $d$ represents a positive integer from 1 to 4, B represents an acetyl group or hydrogen, A represents an acetoxy- or hydroxyl group or hydrogen, Y represents an oxygen or a sulphur atom, Z represents the non-metallic atoms necessary to complete a heterocyclic nucleus containing from 5 to 6 atoms in the heterocyclic ring such as those selected from the group consisting of those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl) thiazole, etc.), those of the benzothiazole series (e.g. benzothiazole, 4-chloro-benzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxyzenzothiazole, 5,6-dioxymethylenebenzothiazole, 5-hydroxybenzothiazole, 6-hydroxybenzothiazole, 5,6-di-methylbenzothiazole, etc.), those of the naphthothiazole series (e.g. alpha-naphthothiazole, beta-naphthothiazole, 5-methoxy-beta-naphthothiazole, 5-ethoxy-beta-naphthothiazole, 8-methoxy-alpha-naphthothiazole, 7-methoxy-alpha naphthothiazole, etc.), those of the thionaphtheno-7′,6′,4,5-thiazole series (e.g. 4′-methoxythionaphtheno-7′,6′,4,5-thiazole, etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. alpha-naphthoxazole, beta-naphthoxazole, etc.), those of the selenazole series (e.g. 4-mthylselenazole, 4-phenylselenazole, etc.), those of the benzoselenazole series (e.g. benzoselenazole, 5-chlorobenzoselenazole, 5-methoxybenzoselenazole, 5-hydroxybenzoselenazole, tetrahydrobenzoselenazole, etc.), those of the naphthoselenazole series (e.g. alpha-naphthoselenazole, beta-naphthoselenazole, etc.), those of the thiazoline series (e.g. thiazoline, 4-methylthiazoline, 4-hydroxymethyl-4-methyl-thiazoline, 4,4-bis-hydroxymethyl-thiazoline, 4-acetoxymethyl-4-methyl-thiazoline, 4,4-bis-acetoxymethyl-thiazoline, etc.), those of the oxazoline series (e.g. oxazoline, 4-hydroxymethyl-4-methyl-oxazoline, 4,4-bis-hydroxymethyl-oxazoline, 4-acetoxy-methyl-4-methyl-oxazoline, 4,4-bis-acetoxymethyl-oxazoline, etc.), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g. quinoline, 6-methoxyquinoline, 7-methylquinoline, 8-mthylquinoline, etc.), those of the 1-isoquinoline series (e.g. isoquinoline, 3,4-dihydroisoquinoline, etc.), those of the 3-isoquinoline series (e.g. isoquinoline, etc.), those of the 3,3-dialkylindolenine series (e.g. 3,3-dimethylindolenine, 3,3,5-trimethylindolenine, 3,3,7-trimethylindolenine, etc.), those of the pyridine series (e.g. pyridine, 5-methylpyridine, etc.), those of the benzimidazole series (e.g. 1,3-diethylbenzimidazole, 1-ethyl-3-phenylbenzimidazole, 1-ethyl-3-hydroxyethyl-5,6-dichlorobenzimidazole, 1-ethyl-3-acetoxyethyl-5,6-dichlorobenzimidazole, 1,3-dethyl-5-chlorobenzimidazole, 1,3-diethyl-6-chlorobenzimidazole, etc.), and X represents an acid radical such as chloride, bromide, iodide, perchlorate, benzenesulphonate, p-tolusulphonate, methylsulphate, ethylsulphate, etc.

(2) Styryl dyes represented by the following general formula

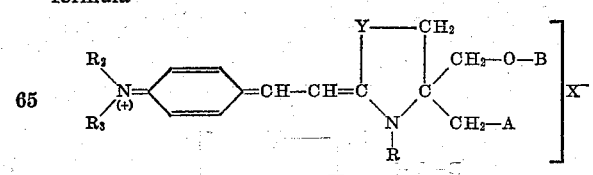

II wherein R, A, B and X have the values as set forth above and R₂ and R₃ each represents an alkyl group such as methyl and ethyl.

(3) Merocyanine dyes represented by the following general formula

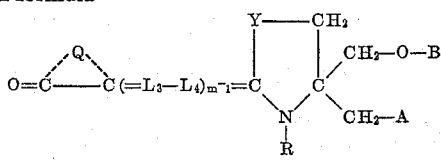

III wherein R, A, B and Y have the same value as set forth above, m represents a positive integer from 1 to 3, $L_3$ and $L_4$ each represents a methine group such as the methine group defined by $L_1$ and $L_2$ above and Q represents the non-metallic atoms necessary to complete a heterocyclic nucleus containing five atoms in the heterocyclic ring, three of said atoms being carbon atoms, at least one of both atoms which are not carbon atoms being a nitrogen atom, the other being selected from the group consisting of oxygen, sulphur and nitrogen atoms, e.g. a 2-thio-2,4-thiazolidine-dione nucleus such as a 3-ethylrhodaine nucleus, a 3-allylrhodanine nucleus, etc., a 2-thio-2,5-thiazolidine dione nucleus, a 2-thio-2,4-oxazoledione nucleus, a pyrazolone nucleus, a 2-thiohydantoine nucleus such as a 1-phenyl-3-n-hexyl-2-thiohydantoine nucleus, a 1-ethyl-3-methyl-2-thiohydantoine nucleus etc., a 2-ethylthio-5-thiazolone nucleus, etc.

(4) Rhodacyanine dyes represented by the following general formula

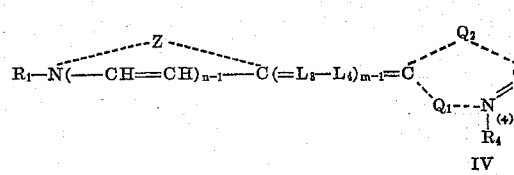

IV wherein R, $R_1$, $L_1$, $L_2$, $L_3$, $L_4$, n, m, Z, B, A, Y and X have the values as set forth above, p represents a positive integer from 1 to 2, $R_4$ represents an alkyl-group such as methyl, ethyl, propyl allyl etc. (e.g. an alkyl-group of the formula $C_qH_{q+1}$ wherein q represents a positive integer from 1 to 4), and $Q_1$ and $Q_2$ represents together the non-metallic atoms necessary to complete a heterocyclic nucleus containing five atoms in the ring, at least one atom being a carbon atom to which is attached an oxygen atom by a double bound such as a 4-thiazolidone nucleus, a 5-thiazolidone nucleus, a hydantoine nucleus, etc.

(5) Rhodacyanine dyes represented by the following general formula

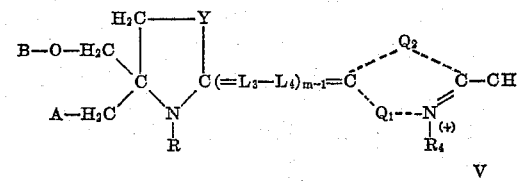

V wherein R, $R_1$, $L_1$, $L_2$, $L_3$, $L_4$, n, Z, B, A, Y, X, p, m, $R_4$, $Q_1$ and $Q_2$ have the values as set forth above.

According to the process of our invention we prepare the polymethine dyes represented by the Formulae I, II, III, IV and V starting from the cyclammonium quaternary salts represented by the following general formula

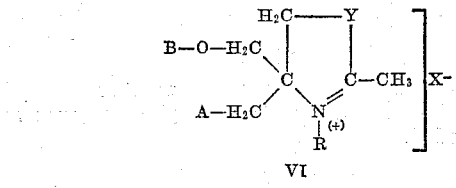

VI wherein B, A, R, Y and X have the values as set forth above.

The heterocyclic cyclammonium quarternary salts represented by Formula VI can easily be prepared by quaternization of the corresponding 2-methyl-4-(acetoxymethyl)- or 2-methyl-4-(hydroxymethyl)-$\Delta^2$-thiazolines or -oxazolines represented by the following general formula

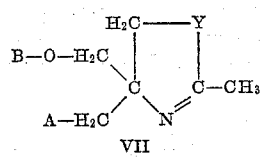

VII wherein A, B and Y have the values as set forth above. The 2-methyl-4-(acetoxymethyl)- and 2-methyl-4-(hydroxymethyl)-$\Delta^2$-thiazolines (Formula VII, Y=S) can advantageously be prepared from the corresponding 2-methyl-4-(hydroxymethyl)-$\Delta^2$-oxazolines (Formula VIII, Y=O, A=OH or H and B=H) by the method described by J. Nys and J. Libeer, Bull. Soc. Chim. Belg., 65 (1956), 403–419 (see U.S. Patent 2,823,207).

The 2-methyl-4-(hydroxymethyl)-$\Delta^2$-oxazolines (Formula VII, Y=O, B=H and A=OH or H) can advantageously be prepared by refluxing a mixture consisting

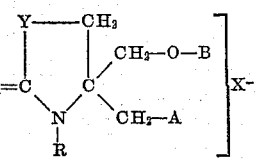

VIII wherein A represents an hydroxylgroup or hydrogen, and acetic acid, whilst simultaneously removing the released water (see J. Nys and J. Libeer, Bull. Soc. Chim. Belg., 65 (1956), 377–402). The 2-methyl-4-(acetoxymethyl)-$\Delta^2$-oxazolines (Formula VII, Y=O, B=COCH$_3$ and A=OCOCH$_3$ or H) can advantageously be prepared by refluxing an intimate mixture of the $\beta$-polyhydroxy-t-butylamines of Formula VIII with acetic anhydride, removing the liberated acetic acid and the excess acetic anhydride and subsequently submitting the reaction mixture to distillation at atmospheric pressure (see J. Nys and J. Libeer, Bull. Soc. Chim. Belg., 65 (1956), 377–402).

Surprisingly it has been found that the carbon-atom of the methylgroup in the 2-position of quaternized 4-(hydroxymethyl)- or 4-(acetoxymethyl)-substituted 2-methyl-thiazolines or -oxazolines shows a markedly more pronounced nucleophilic reactivity than the corresponding carbon-atom of the 4-unsubstituted oxazolines and thiazolines. Thus, while the 2-methyl-$\Delta^2$-oxazoline and -thiazoline quaternary cyclammonium salts, unsubstituted in the 4-position, generally react reluctantly wth suitable intermediates to give the corresponding polymethine dyes, the 4-(hydroxymethyl)- or 4-(acetoxymethyl)-substituted 2-methyl-Δ²-thiazolines and -oxazolines are, after quaternization, easily condensed in the usual manner to the desired polymethine dyes, e.g. symmetrical trimethinecyanine dyes when the condensation occurs in the presence of ethyl-ortho-formate. The enhanced nucleophilic reactivity of the 2-methyl carbon-atom is maintained when the 4-substituted oxazoline- and thiazoline quaternary cyclammonium salts are condensed with suitable electrophilic intermeidates in view of the preparation of asymmetrical trimethine- and pentamethine cyanine dyes, merocyanine dyes, styryl dyes and rhodacyanine dyes.

New asymmetric cyanine dyes can be prepared according to the process of our invention, by condensing a cyclammonium quaternary salt selected from those represented by Formula VI, with a cyclammonium quaternary salt represented by the following formula

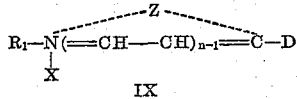

IX wherein $R_1$, X, Z and $n$ have the values as set forth above and D represents an alkylmercapto-, an arylmercapto-, a β-arylaminovinyl-, a β-arylamino-1,3-butadienyl-, a β-alkylmercaptovinyl- or a β-arylmercaptovinylgroup. The condensations are advantageously carried out in the presence of a basic condensing agent e.g. a trialkylamine such as triethylamine, a dialkylaniline, a heterocyclic tertiary amine such as pyridine, N-alkylpiperidine, etc. The condensation can also be carried out in the presence of an inert diluent such as methanol, ethanol, diethylether, acetone, 1,4-dioxane, etc.

New styryl dyes can be prepared according to the process of our invention by condensing a cyclammonium quaternary salt selected from those represented by Formula VI, with a p-dialkylaminobenzaldehyde, advantageously in the presence of a carboxylic acid anhydride e.g. acetic anhydride.

New symmetrical carbocyanine dyes can be prepared according to the process of our invention by condensing a cyclammonium quaternary salt selected from those represented by Formula VI with an ortho-carboxylic acid alkylester, such as ethyl-ortho-formate, ethyl-ortho-acetate, advantageously in the presence of a carboxylic acid anhydride, e.g. acetic anhydride.

New merocyanine dyes can be prepared according to the the process of our invention by condensing a cyclammonium quaternary salt selected from those represented by Formula VI, with a heterocyclic compound represented by the following formula

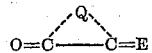

Wherein Q has the value as set forth above and E represents an arylamino-methylene of an -arylaminovinylmethylene group, advantageously in the presence of a basic condensing agent as set forth above.

According to a further feature of our invention, the cyclammonium quaternary salts selected from those represented by Formula VI can be condensed with a compound represented by the following formula

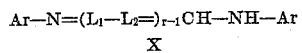

wherein $r$ represents an integer from 1 to 3 and Ar an aryl group. The arylaminovinyl intermediates, or vinylene homologous thereof, obtained can be transformed in the corresponding acetarylido derivatives by boiling with acetic anhydride giving intermediate compounds represented by the following formula

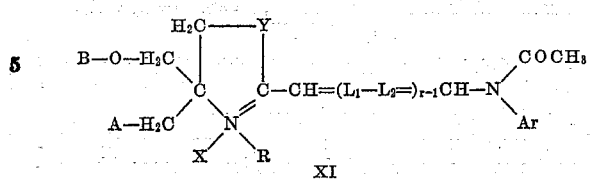

wherein B, A, Y, X, R, $r$ and Ar have the values as set forth above. The intermediate compounds thus obtained can be condensed with cyclammonium quarternary salts containing a methyl group in α- or γ-position, such as those represented by the following general formula

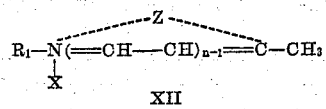

wherein R, X, Z and $n$ have the values as set forth above, to unsymmetrical cyanine dyes. The condensations are advantageously carried out in the presence of a basic condensing agent as set forth above.

The intermediate compounds can also be condensed with cyclic ketomethylene compounds represented by the following formula

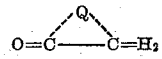

or with compounds represented by the following formula

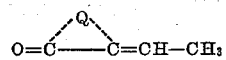

wherein Q has the value as set forth above, to di- and tetramethine merocyanines.

The rhodacyanines according to our invention can be prepared in the usual way from the merocyanines of Formula III or from the cyclammonium quaternary salts represented by Formula VI.

*Preparation of the 2,4-dimethyl-4-hydroxymethyloxazoline-ethiodide (Formula VI, Y=O, B=H and A=H)*

2,4-dimethyl-4-hydroxymethyl-oxazoline (2.60 g.) and ethiodide (3.40 g.) were heated at 100° C. in a sealed tube for 16 hours. After washing with ether and acetone, it had M.P. 167–169° C.

*Preparation of the 2-methyl-4,4-bis-(hydroxymethyl)-oxazoline-ethiodide (Formula VI, Y=O, B=H and A=OH)*

2-methyl - 4,4 - bis-(hydroxymethyl)-oxazoline (10 g.) and ethyliodide (6 cm.³) were heated in a closed vessel at 100° C. for 90 hours. The residual oil is dissolved in boiling acetone and the pure ethiodide crystallized on cooling this solution.

After recrystallization from acetone it had M.P. 102–103° C.

*Preparation of the 2,4-dimethyl-4-acetoxymethyl-oxazoline-ethiodide (Formula VI, Y=O, B=COCH₃, A=H)*

2,4 - dimethyl - 4 - acetoxymethyl-oxazoline (3.4 g.) and ethiodide (3.4 g.) were heated in a closed vessel at 100° C. for 16 hours. The reaction mixture was washed with acetone-ether, and the residual oil recrystallized from ethanol, to give the pure ethiodide, M.P. 104–105° C.

*Preparation of the 2,4-dimethyl-4-acetoxymethyl-thiazoline-ethiodide (Formula VI, Y=S, B=COCH₃, A=H)*

2,4-dimethyl - 4 - acetoxymethyl-thiazoline (9.4 g.) and ethyliodide (8.6 g.) were heated in a closed vessel at 100° C. for 50 hours. The yellow oil was washed with ether, and recrystallized from anhydrous ethanol, yielding the pure ethiodide, M.P. 139° C.

*Preparation of the 2-methyl-4,4-bis-(acetoxymethyl)-thiazoline-ethiodide (Formula VI, Y=S, B=COCH₃, A=OCOCH₃)*

2-methyl-4,4-bis-(acetoxymethyl)-thiazoline (5 g.) and ethyliodide (3.8 g.) were heated in a closed vessel at 100° C. for 20 hours. The resulting yellow syrup was washed with ether, then dissolved in anhydrous ethanol. The alcoholic solution was boiled for a few minutes with charcoal (Norit), filtered, and ether was then added to the filtrate. The precipitated solid was collected and recrystallized from chloroform as white microscopic needles M.P. 76–77° C.

*Preparation of the 2,4-dimethyl-4-acetoxymethyl-thiazoline and the 2-methyl-4,4-bis-(acetoxymethyl)-thiazoline (Formula VII, Y=S)*

Cf. our copending application filed on even date herewith, "4-hydroxymethyl- and 4-acetoxymethyl-2-methyl-Δ²-thiazolines and preparation thereof."

*Preparation of the 2-methyl-4,4-bis-(hydroxymethyl)-oxazoline (Formula VII, Y=O, B=H, A=OH)*

$\beta,\beta',\beta''$-Trihydroxy-t-butylamine (Formula VIII, A=OH) (24 g.) was dissolved in acetic acid (18 cm.³) and the mixture heated under reflux in a fractionating column assembly provided with an adequate still head. The water, liberated during the reaction, was continuously removed. After the theoretical amount of water (7.2 cm.³) had distilled, the residual light-yellow liquid was further distilled in vacuo. The fraction, distilling over the range 150–165° C. under a vacuum of 5 mm. Hg was dissolved in boiling dioxane. Diethyl ether was cautiously added to the hot solution until a slight turbidity was produced. After cooling, the precipitated crystalline solid was removed by filtration.

Recrystallization from chloroform-ether and finally from ethyl-acetate gave the pure oxazoline, M.P. 95–97° C.

*Preparation of the 2,4-dimethyl-4-hydroxymethyl-oxazoline (Formula VII, Y=O, B=H, A=H)*

This was prepared in the same manner as the corresponding 4,4'-bis-(hydroxymethyl)-derivative, from $\beta,\beta'$-dihydroxy-t-butylamine (Formula VIII, A=H, 21 g.) and acetic acid (13 cm.³). The crude 2,4-dimethyl-4-hydroxymethyl-oxazoline, which remained in the reaction flask as a syrupy liquid after the liberated water and the excess acetic acid were removed under reduced pressure, was purified by distillation at atmospheric pressure, B.P. 207–209° C. It crystallized on standing overnight at 0° C., M.P. 30–31° C.

*Preparation of the 2,4-dimethyl-4-acetoxymethyl-oxazoline (Formula VII, Y=O, B=COCH₃, A=H)*

$\beta,\beta'$-bis-(Hydroxy)-t-butylamine (10.5 g.) and acetic anhydride (50 cm.³) were heated under reflux for 1 hour. After removal of the liberated acetic acid and of the excess acetic anhydride, the reaction mixture was further distilled at atmospheric pressure and the 2,4-dimethyl-4-acetoxymethyloxazoline, B.P. 208–210° C., was obtained in a yield of 70%.

*Preparation of the 2-(2'-acetanilidovinyl)-4,4-bis-(acetoxymethyl)-oxazoline-ethiodide (Formula XI, Y=O, A=OCOCH₃, B=COCH₃, r=2)*

2 - methyl - 4,4 - bis - (hydroxymethyl) - oxazoline-ethiodide (10 g.) and diphenylformamidine (10 g.) were throughly mixed and heated at 135° C. for 20 minutes. After cooling the reaction mixture and washing several times with ether, acetic anhydride was added (20 cm.³). The resulting solution was heated under reflux for 10 minutes. After cooling, the acetanilidovinyl derivative was precipitated by addition of ether. A syrupy oil was obtained, which was used without further purification.

*Preparation of the 2-(2'-acetanilidovinyl)-4-methyl-4-acetoxymethyl-oxazoline-ethiodide (Formula XI, Y=O, A=H, B=COCH₃, r=2)*

This intermediate was obtained similarly from 2,4-dimethyl-4-acetoxymethyl-oxazoline ethiodide (5 g.), diphenylformamidine (6 g.) and acetic anhydride (8 cm.³). The resulting viscous oil was used without further purification in the preparation of the dyes.

*Preparation of the 2-(2'-acetanilidovinyl)-4-methyl-4-acetoxymethyl-thiazoline ethiodide (Formula XI, Y=S, A=H, B=COCH₃, r=2)*

This intermediate was prepared in the usual way, from 2,4-dimethyl-4-acetoxymethyl-thiazoline ethiodide (3.4 g.) and diphenylformamidine (2.9 g.), which were thoroughly mixed and heated at 140° for ½ hour. After cooling, the reaction mixture was washed with ether, whereby the crude anilinovinyl derivative was obtained as an oil. The latter crude reaction product (3.2 g.) and acetic anhydride (5 cm.³) were heated under reflux for 15 minutes. Ether was then added to the chilled reaction mixture, whereby the acetanilidovinyl derivative separated as a solid. The precipitate was collected and washed several times with ether-acetone. It had M.P. 208–211° C.

*Preparation of the 2-(2'-acetanilidovinyl)4,4-bis-acetoxymethyl)-thiazoline ethiodide (Formula XI, Y=S, A=OCOCH₃, B=COCH₃, r=2)*

This intermediate was obtained from 2-methyl-4,4-bis-(acetoxymethyl)-thiazoline ethiodide (2 g.) and diphenylformamidine (1.25 g.) which were intimately mixed, and heated together at 145° for 20 minutes. The yellow oil, obtained by washing the cooled reaction mixture with ether, was heated in boiling in acetic anhydride (3 cm.³) for 5 minutes. The desired acetanilidovinyl derivative separated as an oil on addition of ether. It was used without further purification.

*Preparation of the 2-acetanilido-tetramethine-4,4-bis-(acetoxymethyl)-oxazoline ethiodide (Formula XI, Y=O, A=OCOCH₃, B=COCH₃, r=3)*

This intermediate was prepared by boiling a solution of 2-methyl-4,4-bis-(hydroxymethyl)-oxazoline ethiodide (1.0 g.) and α-phenylamino-α-phenyliminopropen hydrochloride (0.85 g.) in acetic anhydride (10 cm.³) for 5 minutes. It was precipitated with ether as a syrup and used without further purification.

EXAMPLE 1

[2 - {3 - ethyl - naphtho - (1':2' - 4:5) - thiazole}]-[2 - {3 - ethyl - 4,4 - bis - (acetoxy - methyl) - oxazoline}]-trimethinecyanine iodide (dye No. 2, Table I)

2 - (2' - acetanilidovinyl) - 4,4 - bis - (acetoxymethyl)-oxazoline ethiodide (2.0 g.) and 2-methyl-naphtho-(1':2'-4:5)-thiazole ethiodide (1.5 g.) were dissolved in ethanol (15 cm.³). The solution was cooled in ice. Triethylamine (0.5 cm.³) was then added, and the reaction mixture was kept at 0° for 15 minutes. Ether was added to the solution, whereby the dye precipitated. It recrystallized from ethanol, M.P. 137–139° C. (Found: N, 4.25%; $C_{27}H_{31}O_5N_2SI$ requires N:4.50%); λ max.=479 mμ.

EXAMPLE 2

[2-{3-ethyl-naphtho-(1':2'- 4:5)-thiazole}]-[2-(3-ethyl-4-methyl-4-acetoxymethyl-oxazoline)]-trimethinecyanine iodide (dye No. 3, Table I)

A mixture of 2-(2'-acetanilidovinyl)-4-methyl-4-acetoxymethyl-oxazoline ethiodide (2.3 g.), 2-methyl-naphtho-(1':2'-4:5)-thiazole ethyl-ethosulphate and pyridine (20 cm.³) were boiled under reflux for 10 minutes. The dye precipitated when ether was added to the cooled reaction mixture. After recrystallization from methanol, it had M.P. 179–181° C. (Found: N, 4.80%; $C_{25}H_{29}O_3N_2SI$ requires N, 4.96%); λ max.=497 mμ.

EXAMPLE 3

[2-(3-ethylbenzothiazole)]-[2-{3-ethyl-4,4 - bis -(acetoxymethyl)-oxazoline}]-trimethinecyanine perchlorate (dye No. 5, Table I)

2 - (2'- acetanilidovinyl)- 4,4 - bis -(acetoxymethyl)-oxazoline ethiodide (2.6 g.) and 2-methylbenzothiazole ethiodide (1.5 g.) were dissolved in ethanol (15 cm.³). The solution was cooled in ice, and triethylamine (0.7 cm.³) was slowly added. The mixture was kept at 0° C. for 15 minutes. Ether was then added until the dye precipitated. The dye was then redissolved in ethanol and transformed into the corresponding perchlorate with an aqueous solution (10%) of sodium perchlorate. After recrystallization from ethanol, it had M.P. 161–162° C. (Found: N, 5.13%; $C_{23}H_{29}O_5N_2S.ClO_4$ requires N, 5.14%); λ max.=478 mμ.

EXAMPLE 4

[2-(3-ethylbenzothiazole)]-[2-(3-ethyl-4-methyl-4-acetoxymethyl-oxazoline)]-trimethinecyanine perchlorate (dye No. 6, Table I)

This dye was obtained similarly from 2-(2'-acetanilidovinyl)-4-methyl-4-acetoxymethyl-oxazoline ethiodide (2.36 g.), 2-methylbenzothiazole ethiodide (1.5 g.) and triethylamine (0.7 cm.³). The dye recrystallized from ethanol to give the pure cyanine perchlorate, M.P. 197–199° C. (Found: N, 5.73%; $C_{21}H_{27}O_3N_2S.ClO_4$ requires 5.75%); λ max.=477 mμ.

EXAMPLE 5

[2-(3-ethylbenzoselenazole)]-[2-(3-ethyl - 4 - methyl-4-acetoxymethyl-oxazoline)]-trimethinecyanine - perchlorate (dye No. 8, Table I) was obtained similarly from 2 -(2'-acetanilidovinyl)- 4-methyl-4-acetoxymethyl - oxazoline ethiodide (2.36 g.), 2-methylbenzoselenazole ethiodide (1.8 g.) and triethylamine (0.7 cm.³).

After recrystallization from ethanol, the cyanine perchlorate had M.P. 194–195° C. (Found: N, 5.25%; $C_{21}H_{27}O_3N_2Se.ClO_4$ requires N, 5.24%); λ max.=482 mμ.

EXAMPLE 6

[2-(3-ethylbenzoselenazole)]-[2-{3-ethyl-4,4-bis-(acetoxymethyl) - oxazoline}]-trimethinecyanine perchlorate (dye No. 9, Table I) was obtained similarly from 2-(2'-acetanilidovinyl)-4,4-bis-(acetoxymethyl)-oxazoline ethiodide (2.65 g.), 2-methylbenzoselenazole ethiodide (1.5 g.) and triethylamine (0.7 cm.³) in ethanol (15 cm.³). After recrystallization from methanol, it had M.P. 154–155° C. (Found: N, 4.64%;

$C_{23}H_{29}O_5N_2Se.ClO_4$ requires N, 4.73%); λ max.=484 mμ.

EXAMPLE 7

[2-(3-ethylbenzoxazole)]-[2 -(3-ethyl-4-methyl-4-acetoxymethyl - oxazoline)] - trimethinecyanine perchlorate (dye No. 11, Table I) was obtained similarly from 2-(2'-acetanilidovinyl)- 4-methyl-4 - acetoxymethyl - oxazoline ethiodide (2.15 g.), 2-methylbenzoxazole ethiodide (1.5 g.) and triethylamine (0.7 cm.³) in ethanol (15 cm.³). After recrystallization from ethanol, the dye had M.P. 137–139° C. (Found: N, 5.83%;

$C_{21}H_{27}O_4N_2.ClO_4$ requires N, 5.95%); λ max.=442 mμ.

EXAMPLE 8

[2-(1-ethylquinoline)]-[2-(3-ethyl-4-methyl-4-acetoxymethyl-oxazoline)]-trimethinecyanine perchlorate (dye No. 13, Table I) was similarly obtained from 2-(2'-acetanilidovinyl) - 4 - methyl-4-acetoxymethyl-oxazoline ethiodide (2.36 g.), 2-methylquinoline ethobromide (1.3 g.) and triethylamine (0.7 cm.³) in ethanol (15 cm.³). After recrystallization from ethanol, the dye had M.P. 169–170° C. (Found: N, 5.82%; $C_{23}H_{29}O_3N_2.ClO_4$ requires N, 5.82%); λ max.=507 mμ.

EXAMPLE 9

[2-(1-ethylquinoline)]-[2-{3-ethyl-4,4-bis -(acetoxymethyl)-oxazoline}]-trimethinecyanine iodide (dye No. 14, Table I)

A mixture of 2-(2'-acetanilidovinyl)-4,4-bis-(acetoxymethyl)-oxazoline ethiodide (2.65 g.), 2-methylquinoline ethiodide (1.3 g.), triethylamine (0.7 cm.³) and ethanol (15 cm.³) was kept at 0° C. for 15 minutes with stirring. Ether was then added, whereby the dye precipitated. After recrystallization from ethanol, it had M.P. 117–118°. (Found: N, 4.82%; $C_{25}H_{31}O_5N_2I$ requires N, 4.93%); λ max.=505 mμ.

EXAMPLE 10

[2 -(3-p-carboxybenzyl-5,6-dimethylbenzothiazole)] - [2-(3 - ethyl - 4 - methyl-4-acetoxymethyl-thiazoline)]-trimethinecyanine perchlorate (dye No. 16, Table II)

2 - (2'- acetanilidovinyl)- 4 - methyl-4-acetoxymethyl-thiazoline ethiodide (4.8 g.), 2,5,6-trimethylbenzothiazole-p-carboxy-benzylbromide (4.0 g.), ethanol (100 cm.³) and triethylamine (1.4 cm.³) were kept at 0° C. for 3 hours. The dyestuff was then precipitated with an aqueous solution (10%) of sodium perchlorate. It recrystallized from ethanol-water to give the pure dye, M.P. 234° C. (Found: N, 4.45%; $C_{29}H_{33}O_4N_2S_2.ClO_4$ requires N, 4.39%); λ max.=514 mμ.

EXAMPLE 11

[2 -(3 - ethyl - 6-methylbenzoselenazole)]-[2-(3-ethyl-4-methyl - 4 - acetoxy - methyl - thiazoline)]-trimethinecyanine perchlorate (dye No. 18, Table II)

2-(2'-acetanilidovinyl) - 4 - methyl - 4 - acetoxymethyl-thiazoline ethiodide (7.2 g.), 2,6-dimethyl-benzoselenazole ethiodide, ethanol (100 cm.³) and triethylamine (1.4 cm.³) were kept at 0° C. for 5 minutes. The crystals, collected after precipitation with an aqueous solution (10%) of NaClO₄, were recrystallized from ethanol, M.P. 180–182° C. (Found: N, 4.90%;

$C_{22}H_{29}O_2N_2SSe.ClO_4$ requires N, 4.96%); λ max.=514 mμ.

EXAMPLE 12

[2-(3-ethylbenzoselenazole)]-[2-{3-ethyl - 4,4 - bis-(acetoxymethyl)-thiazoline}]-trimethinecyanine perchlorate (dye No. 20, Table II)

2-(2'-acetanilidovinyl)-4,4-bis - (acetoxymethyl) - thiazoline ethiodide (1.3 g.), 2-methyl-benzoselenazole ethobromide (0.75 g.), ethanol (10 cm.³) and triethylamine (0.4 cm.³) were mixed at room-temperature, and cooled with ice. The mixture was kept at 0° C. for 1 hour with stirring. On adding an aqueous solution (10%) of sodium perchlorate, the dye precipitated. After repeated recrystallization from alcohol, it had M.P. 189–191° C. (Found: N, 4.59%; $C_{23}H_{29}O_4N_2SSe.ClO_4$ requires N, 4.61%); λ max.=515 mμ.

EXAMPLE 13

[2-{3-(p-carboxy-benzyl)-benzoxazole}]-[2-{3-ethyl - 4,4-bis-(acetoxy-methyl) - thiazoline}] - trimethinecyanine iodide (dye No. 22, Table II)

2-(2'-anilinovinyl)-benzoxazole-p-carboxy - benzylbromide (2.2 g.) and 2-methyl-4,4-bis-(acetoxymethyl)-thiazoline ethiodide (2 g.) were dissolved in pyridine (10 cm.³). The mixture was then heated under reflux for 10 minutes. After chilling, ether was added in excess, whereby the dye precipitated. It was redissolved in ethanol and reprecipitated with an aqueous solution (10%) of potassium iodide. After recrystallization from ethanol-ether (5 times) it had M.P. 188–190° C. (Found: N, 4.10%; $C_{29}H_{31}O_7N_2SI$ requires N, 4.13%); $\lambda$ max.= 475 m$\mu$.

EXAMPLE 14

{2-[1-ethyl-3-($\beta$-hydroxy-ethyl) - 5,6 - dichlorobenzimidazole]}-2-[2-(3-ethyl-4-methyl - 4 - acetoxymethyl-thiazoline)]-trimethincyanine perchlorate (dye 24, Table II)

2-(2'-phenyliminoethylidene)-3-ethyl-4-methyl - 4-acetoxymethyl-thiazolidine (1.85 g.), 1-($\beta$-hydroxyethyl)-2-methyl-5,6-dichlorobenzimidazole ethiodide (2.3 g.) were dissolved in pyridine (25 cm.3). Piperidine (0.5 cm.3) was then added, and the mixture was heated on a waterbath at 95° C. for 4 hours. The crude dye was precipitated by addition of ether. It was dissolved again in ethanol, and reprecipitated therefrom with an aqueous solution of sodium perchlorate. The pure dye was obtained by repeated recrystallisation from ethanol, M.P. 158–162° C. (Found: N, 7.00%; $C_{23}H_{30}O_3N_3SCl_2 \cdot ClO_4$ requires N, 7.02%); $\lambda$ max.: 470 m$\mu$.

The 2-(2'-phenyliminoethylidene)-3-ethyl-4-methyl-4-acetoxymethyl-thiazolidine used in the foregoing condensation was prepared as follows: 2-(2'-acetanilidoxinyl)-4-methyl-4-acetoxymethyl-thiazoline ethiodide (3.6 g.) was suspended in benzene (35 cm.3). A solution of 2.6 g. of sodium hydroxide in 5 cm.3 of water was then added. After a few minutes, the benzene layer was removed and evaporated to dryness. The residue was redissolved in acetone and precipitated as a yellow oil with ether. The phenylimino-ethylidene intermediate appeared to be soluble in boiling ligroin but, on cooling, it separated as an oil again, which could not be brought to crystallisation.

EXAMPLE 15

[2-(3-methylbenzothiazole)]-[2-(3-ethyl - 4 - methyl-4-hydroxymethyl - oxazoline)] - monomethincyanine perchlorate

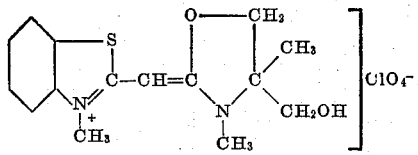

2-methylmercapto - benzothiazole - methylmethosulfate (1.50 g.) and 2,4-dimethyl-4-hydroxymethyl-oxazoline ethiodide (1.45 g.) were dissolved in ethanol (15 cm.3). Triethylamine (0.7 cm.3) was added and the resulting mixture was heated under reflux for 10 minutes. The dye was transformed into the corresponding perchlorate by adding an aqueous solution (10%) of sodium perchlorate. After washing with water and recrystallization from ethanol (4 times) it had M.P. 235–237° C.; $\lambda$ max. 358 m$\mu$.

EXAMPLE 16

[2-(3-methylbenzothiazole)]-[2-(3-ethyl - 4 - methyl-4-acetoxymethyl-oxazoline)]-monomethincyanine-iodide

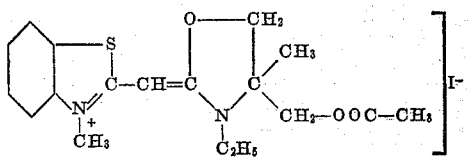

2-methylmercapto-benzothiazole-methyl - methosulfate (2.50 g.) and 2,4-dimethyl-4-aceoxymethyl-oxazoline ethiodide (2.50 g.) were dissolved in ethanol (15 cm.3) and triethylamine (1 cm.3) was added. The mixture was heated under reflux for 20 minutes, and cooled in ice, whereby the dye crystallized. After recrystallization from ethanol it had M.P. 263–266° (with decomposition); $\lambda$ max.: 258 m$\mu$.

EXAMPLE 17

[2-(1-ethylquinoline)]-[2-(3-ethyl-4-methyl - 4 - acetoxymethyl-oxazoline)]-monomethincyanine perchlorate

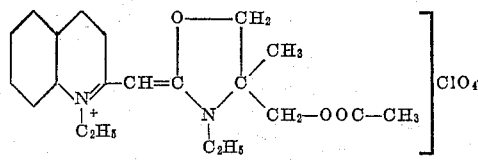

2-ethylmercapto-quinoline-ethylethosulfate (3.40 g.) and 2,4-dimethyl-4-acetoxymethyl - oxazoline ethiodide (3.30 g.) were dissolved in pyridine (20 cm.3) and triethylamine (1.4 cm.3) was added. After shaking the mixture for 5 hours at room temperature, the dye was precipitated with ether, transformed into the corresponding perchlorate and recrystallized from ethanol (3 times) and water; it had M.P. 152° C.; $\lambda$ max.: 398 m$\mu$.

EXAMPLE 18

[2-{3 - ethyl-4,4 - bis-(acetoxymethyl)-oxazoline}]-[2-{3-ethyl - 4,4 - bis-(hydroxymethyl) - oxazoline}] - pentamethincyanine perchlorate

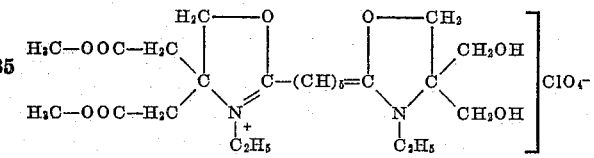

2-acetanilido - tetramethin - 4,4 - bis-(acetoxymethyl)-oxazoline-ethiodide (1.50 g.) and 2-methyl-4,4-bis-(hydroxymethyl)-oxazoline-ethiodide (0.75 g.) were dissolved in pyridine (10 cm.3) and the resulting mixture was heated at 90–95° C. for 5 hours. The dye was precipitated with ether, redissolved in ethanol and transformed into the corresponding perchlorate by adding an aqueous solution of sodium perchlorate. After recrystallization from ethanol it had M.P.: 156–160° C. (with decomposition); $\lambda$ max.: 495 m$\mu$.

EXAMPLE 19

Bis-[2-(3-ethyl-4-methyl-4 - acetoxymethyl - oxazoline)]-trimethincyanine perchlorate

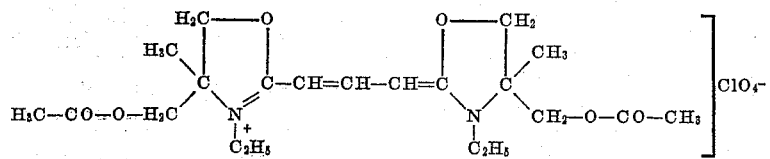

2,4-dimethyl-4-acetoxymethyl - oxazoline - ethiodide (5 g.) was dissolved in acetic anhydride (20 cm.3). Ethyl orthoformate (5 cm.3) was then added, and the mixture was heated under reflux for 1 hour. On addition of ether the dye precipitated as a thick yellow oil.

Owing to the simultaneous presence of several hydrophilic groups in its molecule, it could not been obtained in a crystalline state, even not as a perchlorate. Its purity was nevertheless sufficiently high to allow the unambiguous determination of its absorption maximum, $\lambda$ max.: 390 m$\mu$.

EXAMPLE 20

*2-(p-dimethylaminostyryl)-3 - ethyl-4-methyl - 4acetoxymethyloxazolinium perchlorate*

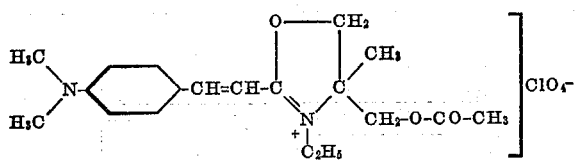

2,4-dimethyl-4-acetoxymethyl-oxazoline ethiodide (3.2 g.) and p-dimethylamino-benzaldehyde (1.5 g.) were dissolved in acetic anhydride (10 cm.$^3$) and the resulting mixture was heated under reflux for ¾ hour. After precipitation with ether, the dye was transformed into its perchlorate by treating with an aqueous solution (10%) of sodium perchlorate. After recrystallization from ethanol it had M.P. 160–161° C. (Found: N, 6.41%; $C_{19}H_{27}O_3N_2.ClO_4$ requires N, 6.49%); λ max.: 456 mµ.

EXAMPLE 21

*[2-(3-ethyl - 4 - methyl-4 - acetoxymethylthiazoline)]-[5-(1-ethyl - 3-methyl-thiohydantoine)] - dimethinemerocyanine*

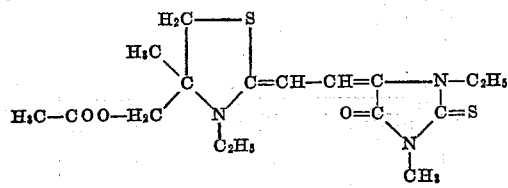

2-(2' - acetanilidovinyl) - 4-methyl - 4 - acetoxymethyl-thiazoline ethiodide (4.88 g.) and 1-ethyl-3-methyl-thiohydantoine (1.58 g.) were dissolved in ethanol (30 cm.$^3$) and triethylamine (1.4 cm.$^3$) was added. The mixture was then heated under reflux for 15 minutes. The dye was precipitated with water; after recrystallization from ethanol-water (4 times) it had M.P. 145–147° C.; λ max.: 460 mµ and 468 mµ.

EXAMPLE 22

*[2-(3-ethyl-4-methyl-4 - acetoxymethyl - thiazoline)]-[5-(3-ethyl-rhodanine)]-dimethinemerocyanine*

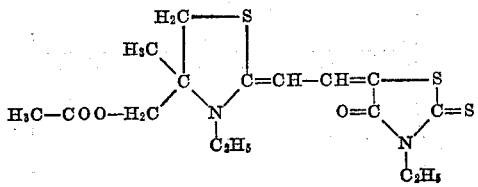

2,5-dimethyl-4-acetoxymethyl-thiazoline ethiodide (3.43 g.) and 3-ethyl-5-acetanilidomethylene-rhodanine (2.00 g.) were dissolved in pyridine (10 cm.$^3$); triethylamine (1.4 cm.$^3$) was then added. The mixture was then heated under reflux for 30 minutes. The dye was precipitated with water as a yellow oil; after recrystallization from ethanol (4 times) it had M.P. 126–128° C.; λ max.: 482 mµ.

EXAMPLE 23

*[2-(3-ethyl-4-methyl - 4-acetoxymethyl - thiazoline)]-[5-(3-ethyl-rhodanine)]-tetramethinemerocyanine*

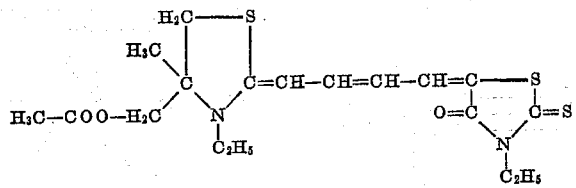

2-(2' - acetanilidovinyl)-4 - methyl - 4 - acetoxymethyl-thiazoline ethiodide (4.46 g.) and 3-ethyl-5-ethylidene-rhodanine (1.87 g.) were dissolved in acetic anhydride (20 cm.$^3$). Triethylamine (1.7 cm.$^3$) was added and the mixture was shaken at room temperature for 15 minutes. The solution was poured into water, and the syrup that separated was washed several times with water. After recrystallization from ethanol (4 times) the dye was obtained; it had M.P. 115° C.; λ max.: 566 mµ.

EXAMPLE 24

*[2-(1-methylquinoline)] - [5 - (3 - ethyl-rhodanine)-2]-[2-{3-ethyl-4,4 - bis - (acetoxymethyl) - oxazoline}]-β-methyl-dimethinerhodacyanine iodide*

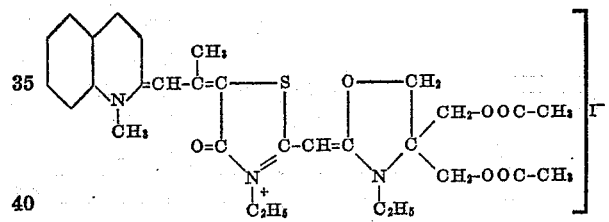

[2-(1-ethylquinoline)] - [5 - (3 - ethylrhodanine)]-β-methyl - dimethinemerocyanine - dimethylsulphate (4.68 g.) and 2-methyl - 4,4 - bis - (acetoxymethyl)oxazoline ethiodide (7.70 g.) were dissolved in pyridine (30 cm.$^3$) and triethylamine (4.2 cm.$^3$) was added. The mixture was heated under reflux for 10 minutes. The dye was precipitated with ether as a syrup, which became solid by washing with ether. After recrystallization from ethanol (4 times) it had M.P. 165–167° C.; λ max.: 615 mµ.

We have found that our new polymethine dyes spectrally sensitize photographic silver halide emulsions when incorporated therein. As may be seen in Tables I and II, the replacement of one or both of the hydrogen atoms in the 4-position of the thiazoline- or oxazoline nucleus by one or two hydroxymethyl or acetoxymethyl groups results in a bathochromic shift of the absorption maximum (as well as of the sensitization maximum) of the resulting unsymmetrical cyanine dyes.

Further, the cyanine and merocyanine dyes according to our invention show a greater solubility in polar solvents than the corresponding dyes derived from Δ$^2$-thiazolines or oxazolines, without hydroxymethyl- or acetoxymethyl substituent in the 4-position. Thus, the residual strains left in the photographic prints by most of the known sensitizing dyestuffs can easily be avoided or for a great part diminished. The dyes can be incorporated in photographic emulsions by any of the methods customarily employed in the art.

This application is a continuation-in-part of our application Serial No. 598,997, filed July 20, 1956, now abandoned.

TABLE I

| Dye No. | Formula | R | R' | Max. in EtOH, mμ |
|---|---|---|---|---|
| 1 | (benzothiazole-Et / oxazolidine structure) | H | H | 490 |
| 2 | | $CH_3-COO-CH_2$ | $CH_3-COO-CH_2$ | 497 |
| 3 | | $CH_3$ | $CH_3-COO-CH_2$ | 497 |
| 4 | (benzothiazole-Pr / oxazolidine structure) | H | H | 467.5 |
| 5 | | $CH_3-COO-CH_2$ | $CH_3-COO-CH_2$ | 478 |
| 6 | | $CH_3$ | $CH_3-COO-CH_2$ | 477 |
| 7 | (benzoselenazole / oxazolidine structure) | H | H | 475 |
| 8 | | $CH_3$ | $CH_3-COO-CH_2$ | 482 |
| 9 | | $CH_3-COO-CH_2$ | $CH_3-COO-CH_2$ | 484 |
| 10 | (benzoxazole / oxazolidine structure) | H | H | 435 |
| 11 | | $CH_3$ | $CH_3-COO-CH_2$ | 442 |
| 12 | (quinoline / oxazolidine structure) | H | H | 500 |
| 13 | | $CH_3$ | $CH_3-COO-CH_2$ | 507 |
| 14 | | $CH_3-COO-CH_2$ | $CH_3-COO-CH_2$ | 505 |

TABLE II

| Dye No. | Formula | R | R' | Max. mμ |
|---|---|---|---|---|
| 15 | (dimethylbenzothiazole, N-CH2-C6H4-COOH / thiazolidine) | H | H | 510 |
| 16 | | $CH_3$ | $CH_2-OOC-CH_3$ | 514 |
| 17 | (dimethylbenzoselenazole / thiazolidine) | H | H | 510 |
| 18 | | $CH_3$ | $CH_2-OOC-CH_3$ | 514 |
| 17 | (benzoselenazole / thiazolidine) | H | H | 507 |
| 18 | | $CH_2-OOC-CH_3$ | $CH_2-OOC-CH_3$ | 515 |
| 21 | (benzoxazole, N-CH2-C6H4-COOH / thiazolidine) | H | H | 469 |
| 22 | | $CH_2-OOC-CH_3$ | $CH_2-OOC-CH_3$ | 475 |
| 23 | (dichlorobenzimidazole N-CH2CH2OH / thiazolidine) | H | H | 473 |
| 24 | | $CH_3$ | $CH_2-OOC-CH_3$ | 470 |

We claim:
A polymethine dye represented by the formula:

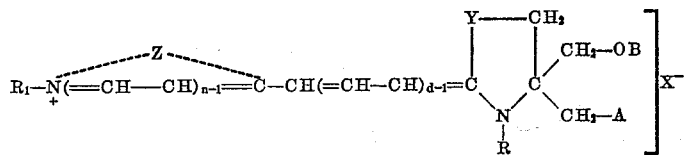

wherein A represents a member selected from the group consisting of an acetoxy group, a hydroxyl group, and a hydrogen atom; B represents a member selected from the group consisting of an acetyl group and a hydrogen atom; Y represents a member selected from the group consisting of an oxygen and a sulphur atom; R and $R_1$ each represents an alkyl group of the formula $C_qH_{2q+1}$ wherein $q$ represents a positive integer from 1 to 4; $n$ represents a positive integer from 1 to 2; $d$ represents a positive integer from 1 to 3; Z represents the non-metallic atom to complete a heterocyclic nucleus selected from the group consisting of a quinoline nucleus, a benzothiazole nucleus, a 5,6-dimethyl-benzothiazole nucleus, a benzoxazole nucleus, a benzoselenazole nucleus, a 6-methyl benzoselenazole nucleus, a naphthothiazole nucleus, a 5,6-dichloro-3-hydroxy-ethyl benzimidazole nucleus, a 4-methyl-4-acetoxy methyl-$\Delta^2$-oxazoline nucleus, and a 4,4-diacetoxy methyl-$\Delta^2$-oxazoline nucleus; and X represents an acid radical of the type used in cyanine dyes.

References Cited in the file of this patent
UNITED STATES PATENTS
2,823,207     Nys et al. _____ Feb. 11, 1958

OTHER REFERENCES
Nys et al.: Bull. Soc. Chim. Belg., vol. 65, pp. 377 to 402 (1956).